UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ORANGE-RED TO VIOLET DYE.

950,359. Specification of Letters Patent. Patented Feb. 22, 1910.

No Drawing. Application filed October 26, 1909. Serial No. 524,679.

*To all whom it may concern:*

Be it known that I, MAX WEILER, doctor of philosophy, chemist, citizen of the German Empire, residing at Elberfeld, Germany, have invented new and useful Improvements in New Dyes, of which the following is a specification.

My invention relates to the manufacture and production of new dyestuffs which are obtained by condensing oxyaldehydes especially oxybenzaldehydes, aldehydoöxybenzoic acids and their substitution products with oxycarboxylic acids and oxidizing the leuco compounds thus obtained. The new dyestuffs can be treated on the fiber with bichromate of potassium, solid shades being thus obtained.

In order to illustrate the new process more fully the following example is given, the parts being by weight: A mixture of 14 parts of 4-oxy-1-benzaldehyde, 33 parts of ortho-cresotinic acid, 300 parts of sulfuric acid (60° Bé.) and 50 parts of glacial acetic acid are heated for 20 hours to 70° C. while stirring until the whole cresotinic acid has entered into reaction. The mass of the reaction is poured into ice water and the leuco compound is filtered off. Small quantities of ortho-cresotinic acid can be removed by means of organic solvents. To produce the coloring matter from this leuco compound the dried product is dissolved in 5 times its quantity of concentrated sulfuric acid and this solution is stirred at 40°–60° C. with $NaNO_2$. When the oxidation is finished the melt is poured on ice and the dye is filtered off. It dyes wool orange-red, which on after-treatment with chrome turns red.

The new dyes are dark powders soluble in dilute caustic soda lye generally with a red color, dyeing wool from acid baths generally from orange red to violet shades, which can be chromed on the fiber.

Instead of ortho-cresotinic acid, meta-cresotinic acid, salicylic acid, para-oxy-benzoic acid, 2.4-dioxy-benzoic acid, chloro-salicylic acid, oxy-naphthoic acids, may be used, instead of 4-oxy-1-benzaldehyde, 3- or 5-methyl-2-oxybenzaldehyde, salicylaldehyde, 2-oxy-3- or 5-chloro-benzaldehyde, 2-oxy-3.5-dichloro-benzaldehyde, 3-chloro-4-oxy-benzaldehyde, 3.5-dichloro-4-oxy-benzaldehyde, 3-methyl-4-oxybenzaldehyde, 2-chloro-4-oxy-benzaldehyde, 4-oxybenzaldehyde-2- or 3-sulfonic acid, aldehydo-ortho- cresotinic acid, aldehydo-para-cresotinic or oxybenzoic acid, 1-aldehydo-2-oxy-4-benzoic acid, aldehydo-para-chloro-salicylic acid, 1-aldehydo-2-oxy-5-sulfo-3-benzoic acid, 5-sulfo-2-oxybenzaldehyde, 3-sulfo-5-methyl-2-oxybenzaldehyde, 4-diethylamino-2-oxybenzaldehyde, 3-nitro-2-oxybenzaldehyde, 5-nitro-2-oxybenzaldehyde, 2.4-dioxybenzaldehyde, 3.4-dioxybenzaldehyde, etc. The condensation can also be carried out in another manner *e. g.* with a mixture of acetic acid and sulfuric acid, a methyl alcoholic sulfuric acid, etc. The oxidation can be carried out with nitric acid, nitro compounds, etc.

I claim:—

The herein described dyestuffs obtainable from the herein defined oxyaldehydes and oxycarboxylic acids, which dyestuffs are dark powders soluble in dilute caustic soda lye generally with a red color, dyeing wool from acid baths generally from orange red to violet shades which can be chromed after dyeing, substantially as described.

In testimony whereof I have hereunto set my hand in the presence of two subscribing witnesses.

MAX WEILER. [L. S.]

Witnesses:
OTTO KÖNIG,
CHAS J. WRIGHT.